Patented Apr. 6, 1943

2,315,855

UNITED STATES PATENT OFFICE 2,315,855

MANUFACTURE OF RUBBER

Louis H. Howland, Cheshire, Conn., assignor to United States Rubber Company, New York, N. Y., a corporation of New Jersey No Drawing. Application March 16, 1940, Serial No. 324,344

4 Claims. (Cl. 260—763)

This invention relates to improvements in the technique of processing high carbon black-rubber mixes prior to vulcanization thereof.

The technique of processing high carbon black-rubber mixes prior to vulcanization thereof, whereby to obtain vulcanizates with improvements in physical and chemical properties, is described in Gerke et al. U. S. P. 2,118,601. The improved vulcanizates prepared by this technique differ from the usual vulcanizates produced by older techniques in that they have (1) relatively lower modulus at low elongation, (2) high resistance to abrasion, (3) relatively higher modulus above 300% elongation, (4) low torsional hysteresis, (5) high electrical resistivity, and are (6) relatively softer.

These aforesaid vulcanizates are obtained by incorporating in the rubber a relatively large amount of carbon black, for example, at least 25 parts, and preferably at least 40 parts in the case of the tire treads, by weight of carbon black per 100 parts by weight of rubber, and then subjecting a substantially homogeneous mixture of the ingredients to a heat treatment at a temperature substantially above 250° F., the preferred temperatures being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to get the desired effects of heat treatment in a shorter period of time, and to provide an agent or promoter to speed up the process of attainment of the desired properties during the technique of processing described in U. S. 2,118,601. I have discovered that the heating operation can be materially shortened by adding to the mixture of rubber and carbon black, prior to the heat treatment, an aromatic nitroso compound in which the nitroso group is attached to a nuclear carbon atom, and which nitroso compound is structurally stable, i. e., incapable of exhibiting tautomerism. The nitroso group is accordingly neither ortho nor para to a substituent having a labile hydrogen atom. The promoter increases the rate of increase of electrical resistivity in the process of U. S. P. 2,118,601.

The invention is further specifically illustrated with respects to the processing of tire tread compositions, it being understood that such compositions before they are vulcanized are to be subjected to the usual steps of shaping, manipulation and mounting attendant upon the manufacture of a vehicle tire, whether of the solid or pneumatic variety, and in which the final article embodies at least as its tread portion, the vulcanized composition of the invention.

In the following examples illustrating the invention, the "parts" are by weight and refer to parts per 100 parts of rubber.

EXAMPLE 1

A carbon black master batch comprising 100 parts of smoked sheets, 55 parts of carbon black, and 2.5 parts of pine tar was mixed on a mill with the mill roll temperature at about 150° F. for about 20 minutes until the carbon black was thoroughly incorporated. Higher mill temperatures may be used even up to 260° F. which is sometimes reached at the end of a ten minute Banbury cycle in factory master batching. This master batch was divided into four parts and to three of these, chemicals were added on a cool mill until the chemical was thoroughly and substantially homogeneously incorporated. Also, the control containing no added chemical was milled for the same length of time. The mixes are represented as follows:

A=0.5 part of o-nitroso nitrobenzene
B=0.5 part of p, p' dinitrosodiphenylpiperazine
C=0.5 part of p-nitroso dimethyl aniline
D=No chemical (control)

These mixes were then milled 10 minutes at a roll temperature of 300° F. After being allowed to cool they were recovered, i. e., reduced to a viscosity suitable for milling in of further compounding ingredients, on a cool mill, and the following ingredients were added: 3 parts of zinc soap of cocoanut oil fatty acids, 2 parts of zinc oxide, 1.0 part of mercaptobenzothiazole (accelerator), 2.0 parts of acetone-diphenylamine reaction product (anti-oxidant), and 2.625 parts of sulfur. The four completed mixes were vulcanized in molds for 60 and 90 minutes at 134.5° C. The vulcanizates showed the following properties:

|  | A | | B | | C | | D | |
|---|---|---|---|---|---|---|---|---|
| Green tensile (lbs./sq.in.) and percent stretch at break: | | | | | | | | |
| 60 min cure | 3483 | 440 | 3509 | 420 | 3914 | 430 | 3786 | 540 |
| 90 min. cure | 3479 | 450 | 3534 | 400 | 3876 | 430 | 3784 | 500 |
| Torsional hysteresis (at 280° F.): | | | | | | | | |
| 90 min. cure | 0.100 | | 0.058 | | 0.066 | | 0.127 | |
| Log R (electrical resistivity): | | | | | | | | |
| 60 min cure | 9.7 | | >12 | | >12 | | 7.5 | |
| 90 min. cure | 9.7 | | >12 | | >12 | | 7.5 | |
| Abrasion and Adams hardness: | | | | | | | | |
| 60 min. cure | 138 | 38 | 160 | 39 | 157 | 17 | 150 | 34 |
| 90 min. cure | 142 | 37 | 161 | 36 | 153 | 36 | 143 | 33 |

The above data show that, for the short period of heating employed, the effects of heat treatment have been more pronounced in stocks A, B and C than in the standard D. Vulcanizates A, B and C have low hysteresis and high electrical resistivity values which are substantially equal to the values obtainable in the standard (control) stock only by prolonging the heat treatment to from 30 to 60 minutes instead of 10 minutes.

EXAMPLE 2

Stocks were made up exactly as in Example 1 with the exception that a different chemical was used. The stocks are designated as follows:

A=0.5 part of p-nitroso diethyl aniline
B=no chemical (control)

The vulcanized stocks showed the following properties.

|  | A | | B | |
|---|---|---|---|---|
| Green tensile (lbs./sq. in.) and per cent stretch at break: | | | | |
| 60 min. at 30 lbs | 4131 | 460 | 3752 | 530 |
| 90 min. at 30 lbs | 4041 | 440 | 3952 | 510 |
| Torsional hysteresis (at 280° F.): | | | | |
| 90 min. at 30 lbs | .068 | | 0.128 | |
| Log R: | | | | |
| 60 min. at 30 lbs | >12 | | 7.5 | |
| 90 min. at 30 lbs | >12 | | 7.3 | |

EXAMPLE 3

A carbon black master batch comprising 100 parts of smoked sheets and 50 parts of carbon black (by weight) was mixed in a conventional manner as set forth in Example 1. This master batch was divided into two parts, and to one of these parts (A) was added 0.2 part of nitroso benzene per 100 parts of rubber on a cool mill in a conventional manner whereby the chemical is thoroughly and substantially homogeneously incorporated. Also, the other part (B) containing no chemical was milled for the same length of time in the conventional manner. These mixes, A and B, were then milled 10 min. at 300° F. After cooling they were recovered on a cool mill and the following ingredients based on 100 parts of rubber were added, 3 parts of zinc soap of cocoanut oil fatty acids, 2 parts of Kadox brand of zinc oxide, one part of palm oil, 5 parts of pine tar, 1 part of the reaction product of acetone and diphenylamine (anti-oxidant), 0.9 part of the reaction product of butaldehyde and methylene aniline (accelerator) and 3.5 parts of sulfur.

The two mixes were then vulcanized 60 and 90 min. at 45 lbs. steam pressure and showed the following properties:

|  | A | | B | |
|---|---|---|---|---|
| Green tensile (lbs./sq. in.) and per cent stretch at break: | | | | |
| 60 min. at 45 lbs | 3912 | 600 | 3904 | 540 |
| 90 min. at 45 lbs | 3555 | 570 | 3415 | 540 |
| Green abrasion and hardness: | | | | |
| 60 min. at 45 lbs | 163 | 32 | 147 | 32 |
| 90 min. at 45 lbs | 159 | 31 | 144 | 26 |

EXAMPLE 4

*Effect on paint black in rubber*

A master batch was made up containing 100 parts of smoked sheets and 45 parts of #242 carbon black (fine particle size paint black). Conventional milling was used in preparing this master batch. The master batch was divided into two parts, and to one of these parts (A) was added 0.5 part of p-nitroso dimethyl aniline per 100 parts of rubber on a cool mill in a conventional manner. Also, the other part (B) containing no promoter was milled for the same length of time in a conventional manner. These mixes, A and B, were then milled 30 min. at 300° F. After cooling, they were recovered on a cool mill, and the usual ingredients to complete a typical tread mix were added.

The two mixes were then vulcanized 60 min. and 90 min. at 30 lbs. steam pressure, and showed the following properties.

|  | A | | B | |
|---|---|---|---|---|
| Green tensile (lbs./sq. in.) and per cent stretch at break: | | | | |
| 60 min. at 30 lbs | 3509 | 470 | 3163 | 520 |
| 90 min. at 30 lbs | 3405 | 450 | 2863 | 460 |
| Torsional hysteresis (at 280° F.): | | | | |
| 60 min. at 30 lbs | .0689 | | .0929 | |
| 90 min. at 30 lbs | .0698 | | .0996 | |
| Log R: | | | | |
| 60 min. at 30 lbs | 12 | | 8.6 | |
| 90 min. at 30 lbs | 12 | | 8.4 | |
| Abrasion and Adams hardness: | | | | |
| 60 min. at 30 lbs | 170 | 43 | 143 | 43 |
| 90 min. at 30 lbs | 154 | 44 | 149 | 44 |

EXAMPLE 5

This example illustrates that the mixes with the present chemicals attain improved properties in a shorter time than the mixes not containing a promoter. It will be observed in the data below that ten minutes heating in the presence of the para nitroso dimethyl aniline is approximately equivalent to 30 minutes without the added chemical.

| Composition | A (control) | B (control) | C | D |
|---|---|---|---|---|
| Smoked sheets | 100 | 100 | 100 | 100 |
| Crow black | 45 | 45 | 45 | 45 |
| p-Nitroso dimethyl-aniline | | | 0.5 | 0.5 |

The aromatic nitroso compound is added to the rubber-carbon black master batch on a cool mill and then milled for the following lengths of time at 300° F.:

| (A) | (B) | (C) | (D) |
|---|---|---|---|
| Minutes 10 | Minutes 30 | Minutes 10 | Minutes 30 |

After cooling at least five minutes, the batch is recovered on a cool mill and the following ingredients added:

| | | | | |
|---|---|---|---|---|
| Zinc soap of cocoanut oil acid | 2.5 | 2.5 | 2.5 | 2.5 |
| Zinc oxide | 1 | 1 | 1 | 1 |
| Pine tar | 2 | 2 | 2 | 2 |
| Sulfur | 4 | 4 | 4 | 4 |
| Reaction product of butaldehyde and methylene aniline | 0.9 | 0.9 | 0.7 | 0.7 |
| Reaction product of acetone and diphenylamine | 1 | 1 | 1 | 1 |

The cure is carried out respectively at 60 minutes, 90 minutes, and 180 minutes at 45 lbs. sq. in. steam pressure.

| Green tensiles (lbs./sq. in.) and percent stretch: | | | | | | | | |
|---|---|---|---|---|---|---|---|---|
| 60 min. at 45 lbs | 4391 | 540 | 4130 | 500 | 4235 | 540 | 4089 | 500 |
| 90 min. at 45 lbs | 4007 | 555 | 3315 | 490 | 3783 | 540 | 3377 | 470 |
| 180 min at 45 lbs | 2950 | 530 | 2720 | 495 | 3036 | 530 | 2823 | 480 |
| Torsional hysteresis (at 280° F.): | | | | | | | | |
| 180 min. at 45 lbs | .098 | | .088 | | .087 | | .077 | |
| Log R: | | | | | | | | |
| 60 min. at 45 lbs | 7.8 | | 12 | | >12 | | >12 | |
| 90 min. at 45 lbs | 8.7 | | 12 | | >12 | | >12 | |
| 180 min. at 45 lbs | 8.1 | | 12 | | >12 | | >12 | |
| Abrasion and Adams hardness: | | | | | | | | |
| 60 min. at 45 lbs | 166 | 42 | 184 | 46 | 182 | 43 | 184 | 48 |
| 90 min. at 45 lbs | 162 | 41 | 172 | 47 | 180 | 46 | 180 | 48 |

Electrical resistivity was determined by measuring the resistance of a specimen of known thickness (about 0.1 inch) placed between mercury electrodes, under a potential difference of 135 volts, using a sensitive galvanometer with an Ayrton shunt. In the tables of data herein, the logarithm (to base 10) of the specific electrical resistivity (ohm-cms.) is designated "Log R."

The torsional hysteresis represents the logarithmic decrement (base 10) of the observed amplitudes of successive oscillations of a torsion pendulum, measured at 280° F. (137.8° C.) with an apparatus consisting essentially of a torsion pendulum in which the sample of rubber tested supplies the restoring force when the pendulum is deflected. For further description of this testing see U. S. P. 2,118,601.

The abrasion resistance is expressed by figures which are inversely proportional to the amount of wear (reduction in thickness) effected during a fixed number of cycles on the United States Rubber Company abrasion testing machine. The machine is operated with the abrasive wheel rotating at 180 R. P. M. and with a total load on the sample of six pounds.

The visible changes taking place in the hot milling method as described in the above examples are somewhat similar to those described in U. S. P. 2,118,601. However, the viscosity increase may even be greater. As the hot milling proceeds the mix finally begins to smooth out. The smoothing out need not necessarily be done on the hot mill but it may be subsequently carried out on a cool mill during recovery of the batch. In the steam heater process in which the mix is not milled during heating, smoothing out does not occur in the heater but is obtained upon the relatively cooler recovery mill.

Other chemicals included in the present invention are such chemicals as nitroso toluene, nitroso xylene, nitroso mesitylene, nitroso ethyl benzene, dinitroso mesitylene, trinitroso mesitylene, nitroso naphthalene, nitroso anthracene, o-nitroso dimethyl aniline, m-nitroso dimethyl aniline, p-nitroso-N-methyl N-dodecyl aniline, p-nitroso di-dodecyl aniline, p-nitroso-o-methyl-dimethylaniline, p-nitroso-N-phenyl-morpholine, p-nitroso-N-phenyl-piperidine, p-nitroso-N-phenyl-pyrol, etc.

The chemicals may also contain substituents such as alkyl, halogen, alkoxy, nitro, etc.

The invention is not limited to the amount of chemical, although the preferred amounts vary from 0.05 to 2.0 parts per one hundred parts of rubber.

The use of these chemicals is not limited to the purity of the chemical. The pure chemicals or crude reaction product from the preparation of these chemicals or admixtures of these chemicals with other chemicals or compositions may be used to speed up the heat treatment process.

The aromatic nitroso compounds may be added at any time during or preceding the heat treatment, that is, they may be added to the rubber before the carbon black, along with it or after the carbon black, and then the resulting master batch subjected to the heat treatment. It is understood that this is controlled within limits avoiding serious degradation of the rubber since it is known that either excessive milling of rubber in air or excessive heating at elevated temperatures of rubber tends to break down (degrade) the rubber molecules. Rubber vulcanizates made from degraded rubber have unusually low tensile strength, poor resistance to tear, and poor resistance to ageing. By the present invention the tensile strength of the resulting vulcanizates is not lowered more than 10% by the heat-treatment. Instead of heat treating on a mill, the heating may be conducted in a heater in an atmosphere of hot air, steam, nitrogen, or a mixture of air and steam, or in water, etc. Where heating is carried out in a medium such as steam or a mixture of air and steam, the stock is preferably heated while in thin layers, while the mixture is static, i. e. there is no mechanical agitation of the mix taking place, as distinguished from a masticating or milling operation. Also, in carrying out the invention the usual softeners and other ingredients, may be included, if desired, in the initial mixture of rubber, black and chemical for the purpose of softening the rubber and facilitating the admixture and distribution of the black therein, or for the purpose of improving the properties of the final vulcanizate; for example, such softeners as oils, tars, fatty acids, fatty acid soaps, and mineral rubber, may be added. The raw rubber may also be blended with reclaimed rubber in any proportions. The rubber used in the master batches may be softened by any of the processes known to the art, such as heating in air, steam or mixtures thereof, or mastication in the presence of zinc oxide, zinc soaps, lead dioxides, or other types of plasticizing agents.

Whereas the invention is adaptable broadly to all kinds of black it is particularly concerned with what are known as rubber reinforcing blacks, which blacks are herein distinguishable from the so-called soft rubber blacks, which are non-reinforcing, and flocculable to a lesser extent by heat, and from blacks of extremely small particle size like paint black and ink black.

While the invention is particularly significant in relation to tire tread compositions, it is also applicable to the manufacture of any rubber products in which are desired the qualities of high abrasion resistance, toughness, flexibility, high electrical resistivity or low hysteresis, etc., such as footwear outsoles, pneumatic inner tubes, hose, belting, vibration-absorbing mountings, tank linings, etc.

The term "rubber" is used in its usual generic sense applicable to caoutchouc and similar vulcanizable gums, as well as to various synthetic rubbers and rubber-like products which have properties in common with natural rubber whereby they may be adapted to the same commercial uses.

The use of these compounds is not limited to the temperature, time, pressure, or method of vulcanization. Also vulcanizing agents other than sulfur may be used for the vulcanization of the compounds used. They may be used in rubber mixes subjected to mold cures, air cures, ammonia cures, submarine cures, steam cures, etc.

The promoters, as stated above, may be added before or during heat treatment, may be put into the rubber by mill incorporation, by impregnation, or otherwise.

Having thus described my invention, what I claim and desire to protect by Letters Patent is:

1. A process which comprises mixing rubber with a relatively large amount of a rubber reinforcing black, and an aromatic nitroso compound which is incapable of exhibiting tautomerism, heating the mix to a temperature substantially above 250° F. and not above about 370° C., and thereafter milling the mix to a viscosity suitable for milling in further desired compounding ingredients.

2. A process which comprises mixing rubber with a relatively large amount of carbon black, and an aromatic nitroso compound which is incapable of exhibiting tautomerism, heating the mix to a temperature substantially above 250° F. and not above about 370° F., and thereafter masticating the mix and completing incorporation of additional compounding and vulcanizing ingredients.

3. A process which comprises mixing rubber with a relatively large amount of carbon black, and an aromatic nitroso compound which is incapable of exhibiting tautomerism, heating the mix to a temperature in the range from about 300° F. to about 370° F., and thereafter masticating the mix and completing incorporation of additional compounding and vulcanizing ingredients.

4. A process which comprises mixing rubber with a relatively large amount of carbon black, and an aromatic nitroso compound which is incapable of exhibiting tautomerism, heating the mix to a temperature substantially above 250° F. and not above about 370° F. to severely flocculate the black, and thereafter masticating the mix for a time sufficient to substantially completely disperse the flocculated black.

LOUIS H. HOWLAND.